United States Patent
Rajagopalan et al.

(10) Patent No.: US 12,007,963 B1
(45) Date of Patent: Jun. 11, 2024

(54) SYSTEM AND METHOD FOR PROCESSING RESOURCES AND ASSOCIATED METADATA IN THE METAVERSE USING KNOWLEDGE GRAPHS

(71) Applicant: BANK OF AMERICA CORPORATION, Charlotte, NC (US)

(72) Inventors: Anurajam Rajagopalan, Tamil Nadu (IN); Sai Srinivas Vartha, Telangana (IN); Durga Prasad Kutthumolu, Telangana (IN); Roy Jyoti Ranjan, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/138,900

(22) Filed: Apr. 25, 2023

(51) Int. Cl.
G06F 16/00 (2019.01)
G06F 16/21 (2019.01)
G06F 16/242 (2019.01)
G06F 16/25 (2019.01)

(52) U.S. Cl.
CPC ........ G06F 16/212 (2019.01); G06F 16/2448 (2019.01); G06F 16/252 (2019.01); G06F 16/258 (2019.01)

(58) Field of Classification Search
CPC .. G06F 16/212; G06F 16/2448; G06F 16/258; G06F 16/252
See application file for complete search history.

(56) References Cited

U.S. PATENT DOCUMENTS

| | | |
|---|---|---|
| 6,054,991 A | 4/2000 | Crane et al. |
| 6,215,495 B1 | 4/2001 | Grantham et al. |
| 7,050,955 B1 | 5/2006 | Carmel et al. |
| 7,200,804 B1 * | 4/2007 | Khavari ............... G06F 16/958 707/E17.119 |
| 9,552,673 B2 | 1/2017 | Hilliges et al. |

(Continued)

FOREIGN PATENT DOCUMENTS

WO 2018080616 A1 5/2018

OTHER PUBLICATIONS

Wei et al., "A Tutorial on Meta-Services and Services Computing in Metaverse," IEEE, 2023, pp. 1-15. (Year: 2023).*

*Primary Examiner* — Cheryl Lewis
(74) *Attorney, Agent, or Firm* — Moore & Van Allen PLLC; Nicholas C. Russell

(57) ABSTRACT

Systems, computer program products, and methods are described herein for processing resources and associated metadata in the metaverse using knowledge graphs. The invention relates to a method for processing and converting documents from a digital data source, involving the following steps: receiving one or more documents from the data source; storing the documents in a network attached storage using a file transfer protocol; converting the documents into an extensible markup language (XML) format; storing the converted documents in an API-accessible document database; generating a downstream process API for accessing the document database; creating an abstract document delineation for the converted documents based on data extracted via the downstream process API; and finally, transforming the abstract document delineation and associated metadata into a semantic, immersive, actionable ontological modeling language, facilitating enhanced document representation and interaction.

20 Claims, 6 Drawing Sheets

(56) References Cited

U.S. PATENT DOCUMENTS

| | | |
|---|---|---|
| 10,191,559 B2 | 1/2019 | Mandella et al. |
| 10,417,812 B2 | 9/2019 | Djorgovski et al. |
| 11,017,601 B2 | 5/2021 | Kim |
| 11,044,281 B2 | 6/2021 | Pilnock et al. |
| 11,107,272 B2 | 8/2021 | Chen et al. |
| 11,151,982 B2 | 10/2021 | Tomkins et al. |
| 11,157,159 B2 | 10/2021 | Bailey et al. |
| 11,209,916 B1 | 12/2021 | Zimmermann et al. |
| 11,215,711 B2 | 1/2022 | Hilliges et al. |
| 11,367,410 B2 | 6/2022 | Day et al. |
| 11,443,120 B2 | 9/2022 | Poddar et al. |
| 2003/0058238 A1 | 3/2003 | Doak et al. |
| 2003/0098881 A1 | 5/2003 | Nolte et al. |
| 2006/0015722 A1* | 1/2006 | Rowan ............... H04L 63/0823 713/166 |
| 2006/0161559 A1* | 7/2006 | Bordawekar ......... G06F 40/143 |
| 2008/0143895 A1 | 6/2008 | Peterka et al. |
| 2012/0229460 A1 | 9/2012 | Fortin |
| 2015/0091891 A1 | 4/2015 | Raheman et al. |
| 2018/0196643 A1* | 7/2018 | Dolby ................... H04L 67/025 |
| 2020/0265075 A1 | 8/2020 | Knapp et al. |
| 2021/0073191 A1* | 3/2021 | Hatami-Hanza ....... G06N 5/022 |

\* cited by examiner

SYSTEM AND METHOD FOR PROCESSING RESOURCES AND ASSOCIATED METADATA IN THE METAVERSE USING KNOWLEDGE GRAPHS

TECHNOLOGICAL FIELD

Example embodiments of the present disclosure relate to processing resources and associated metadata in the metaverse using knowledge graphs.

BACKGROUND

System analysts should have complete knowledge of implemented business changes and their impact. In a traditional approach, where there are multiple owners/permitted accessors of the same document, reviewers may be prone to miss key updates if they are required to manually analyze document version changes.

Applicant has identified a number of deficiencies and problems associated with processing resources and associated metadata in the metaverse using knowledge graphs. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for processing resources and associated metadata in the metaverse using knowledge graphs. The proposed system automatically determines downstream impact of system changes and document interrelation and allows users to visualize this data in a three-dimensional (3D) format in a metaverse setting. As such, the proposed solution aims to streamline the process of building schema with consumption of unstructured change requirement documents with real time ontological actional modeling. This is a cognitive driven methodology to provide instruction on the essential architectural decision considering all application impacts. Creation of schema is done with element mapping which can be held organized by semantic gravitation subjective to similarity or proximity on the unstructured data in a real-time with no delay.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
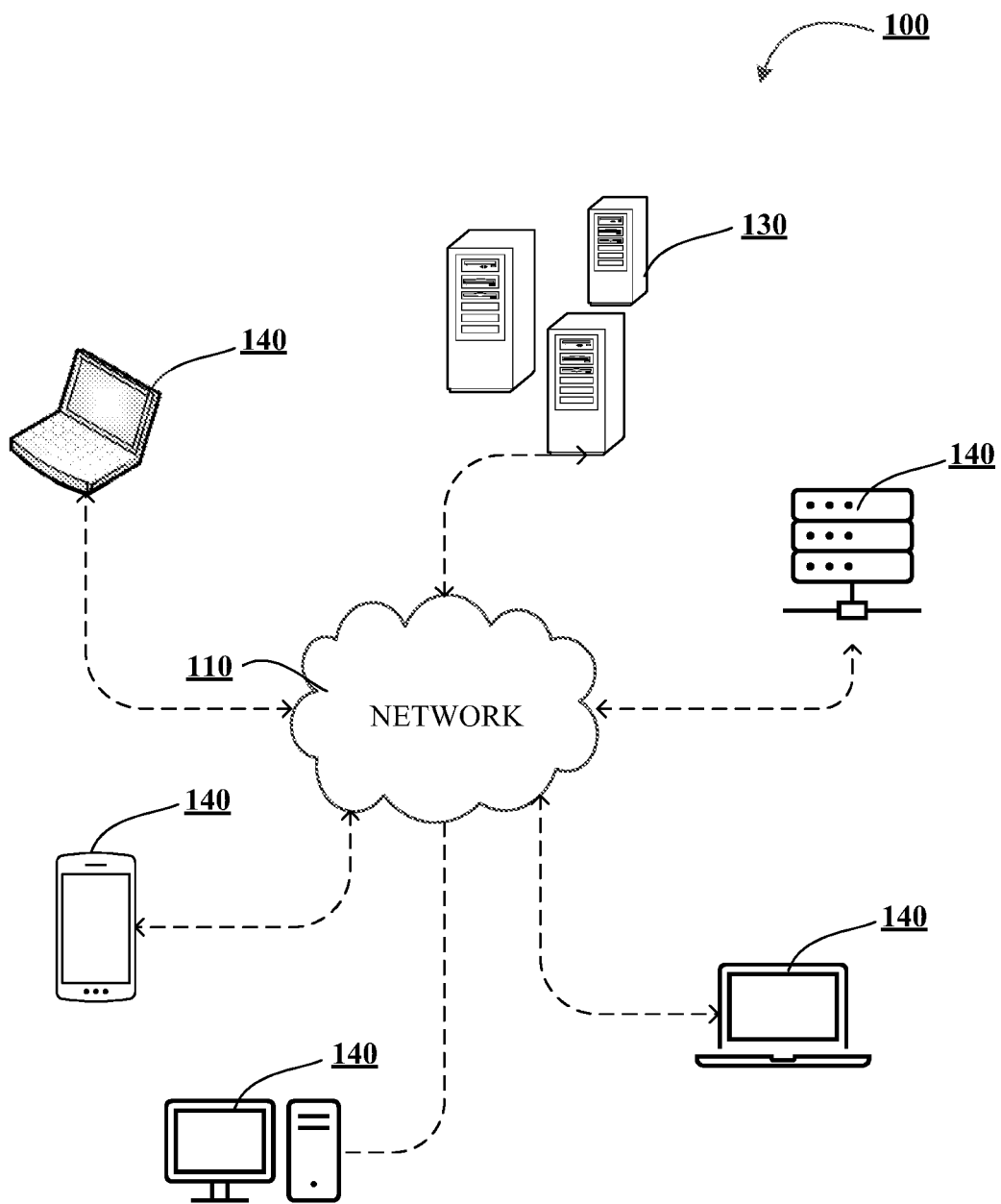
Figure 1B:
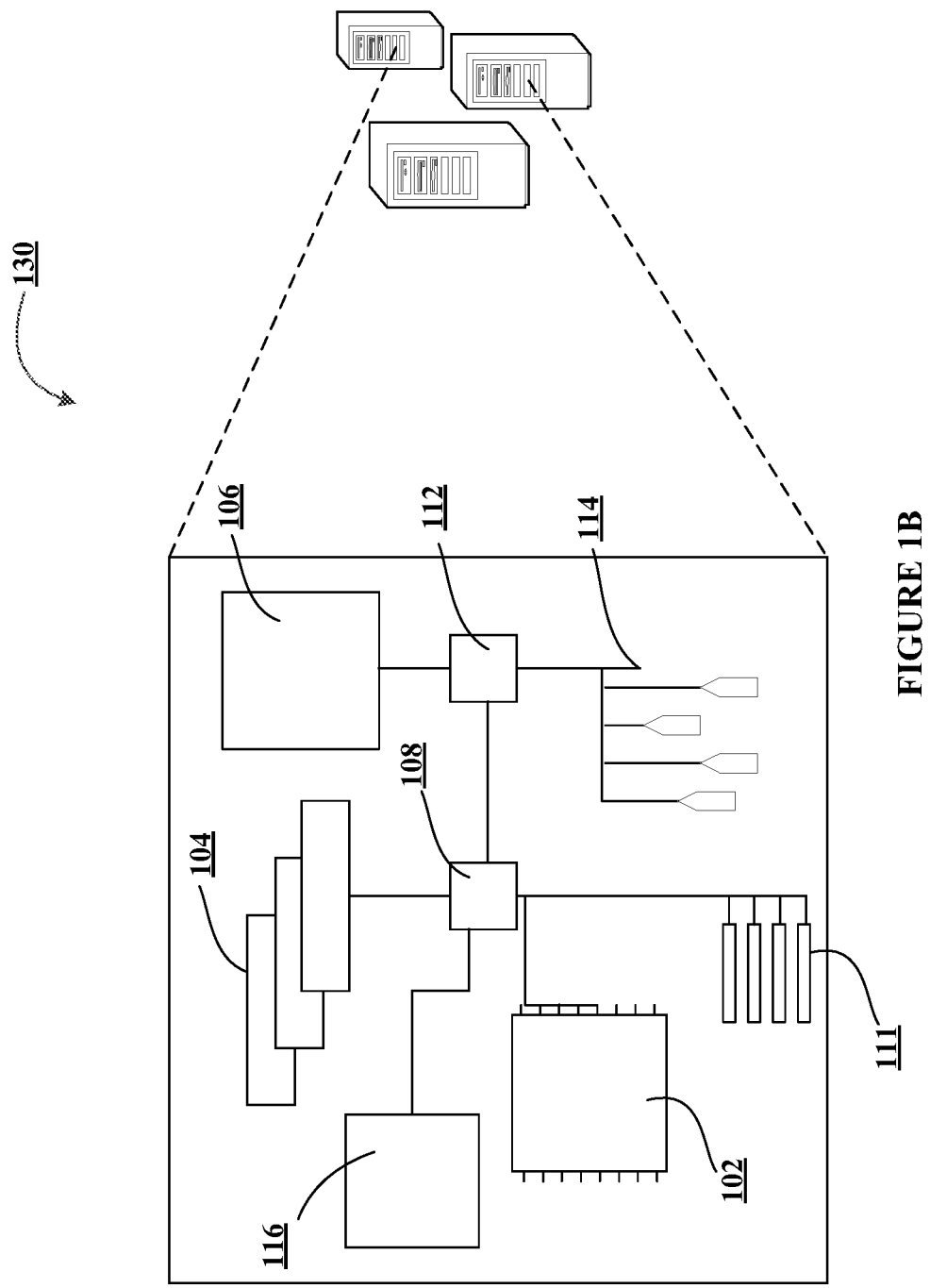
Figure 1C:
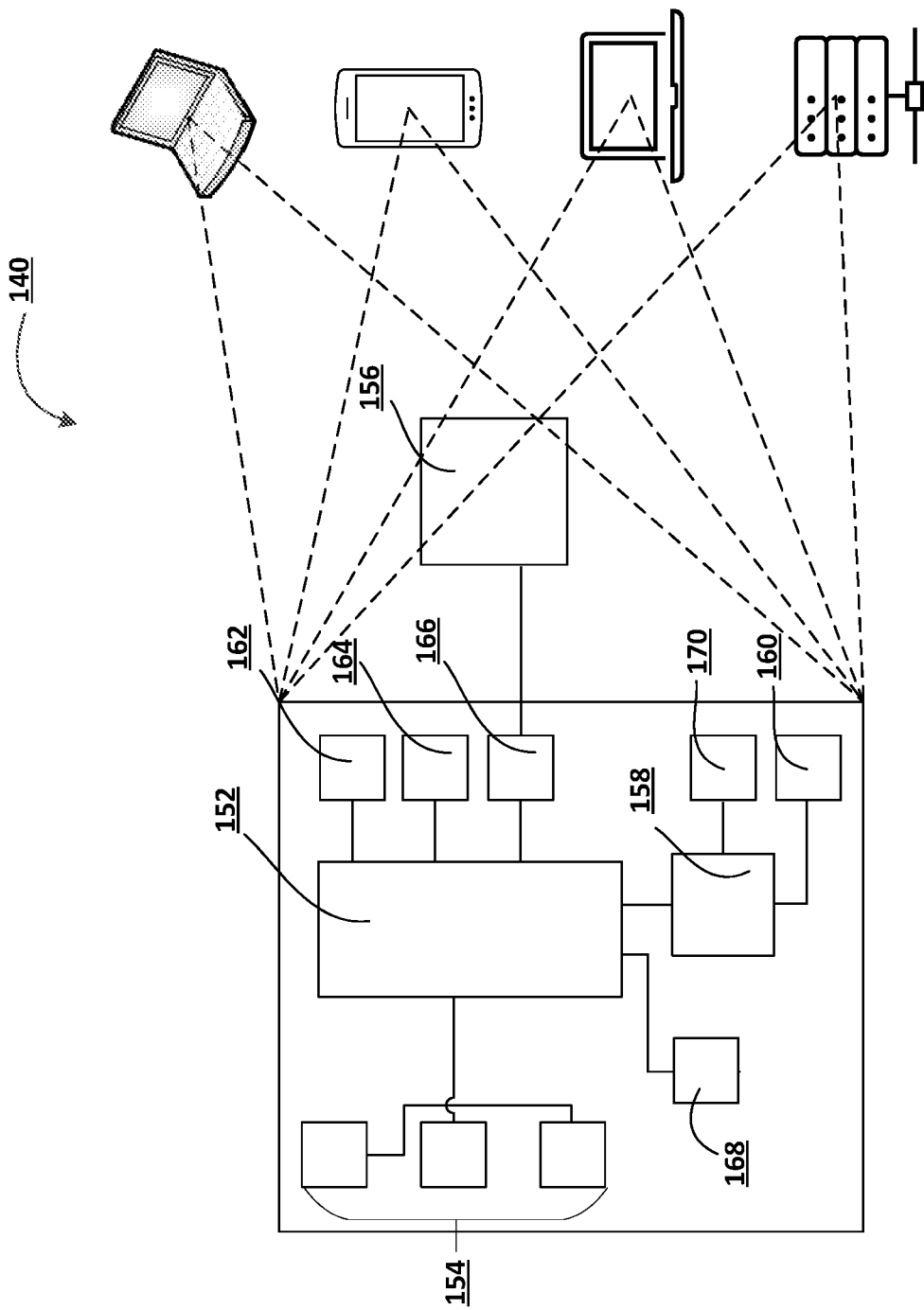
Figure 2:
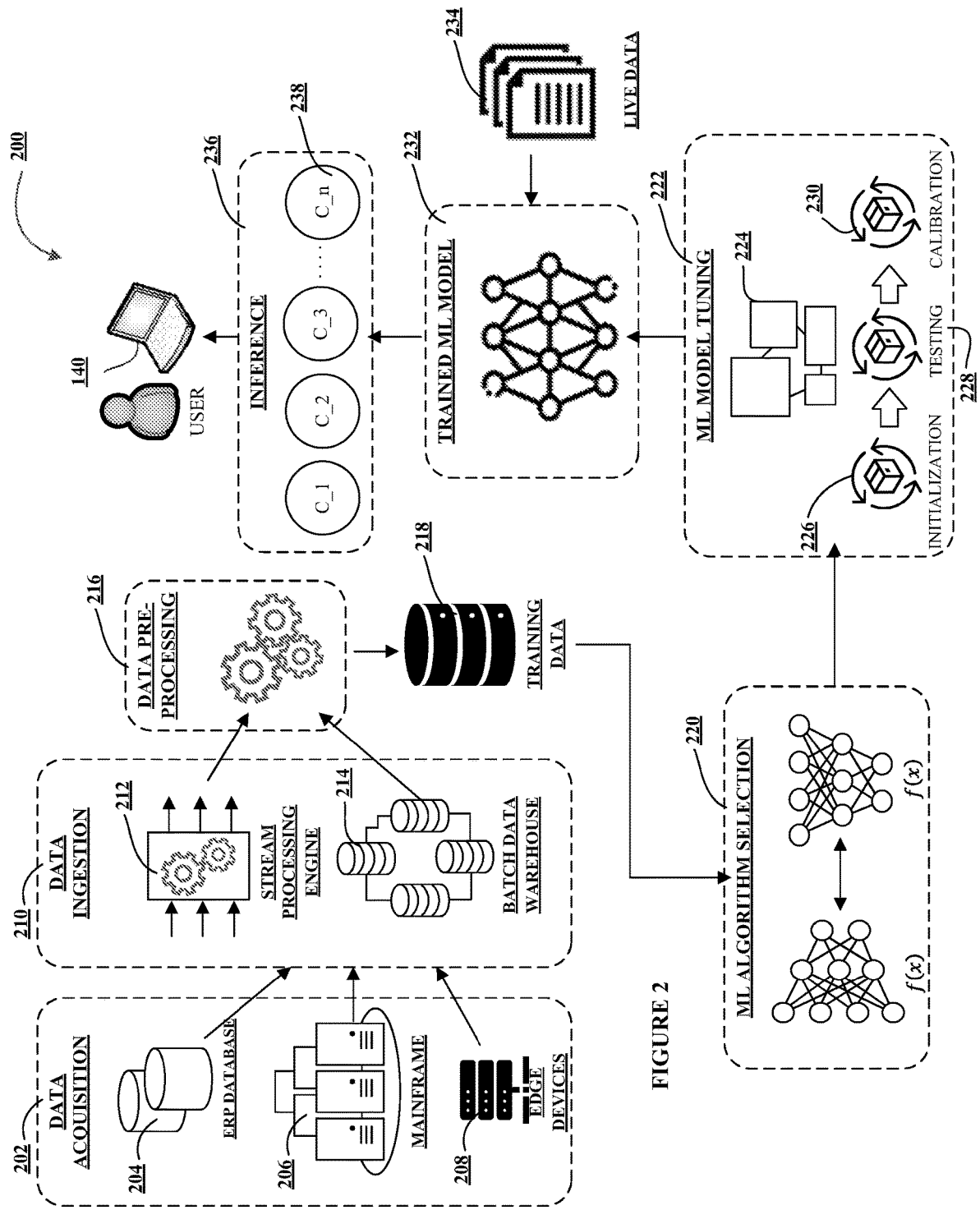
Figure 3A:
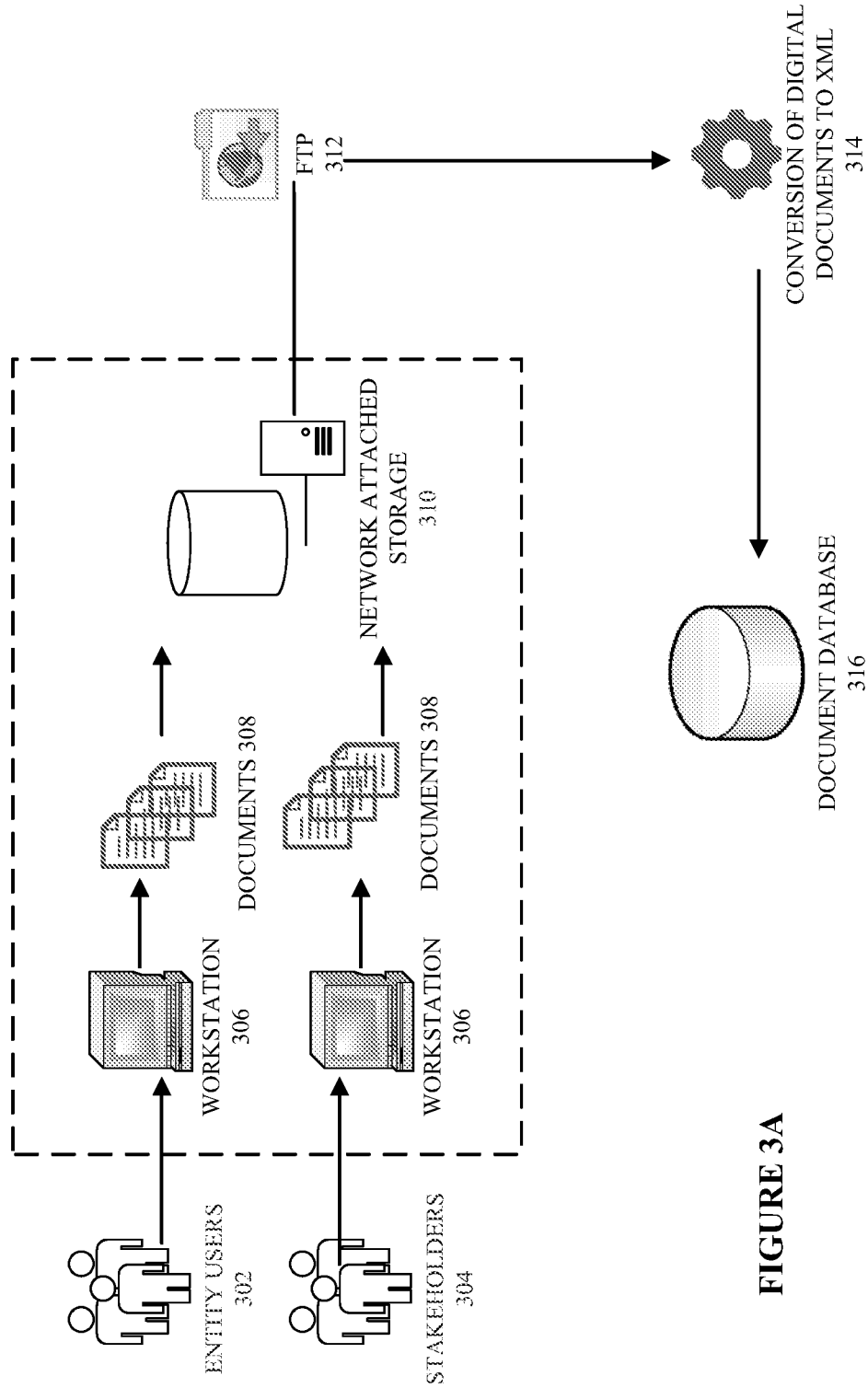
Figure 3B:
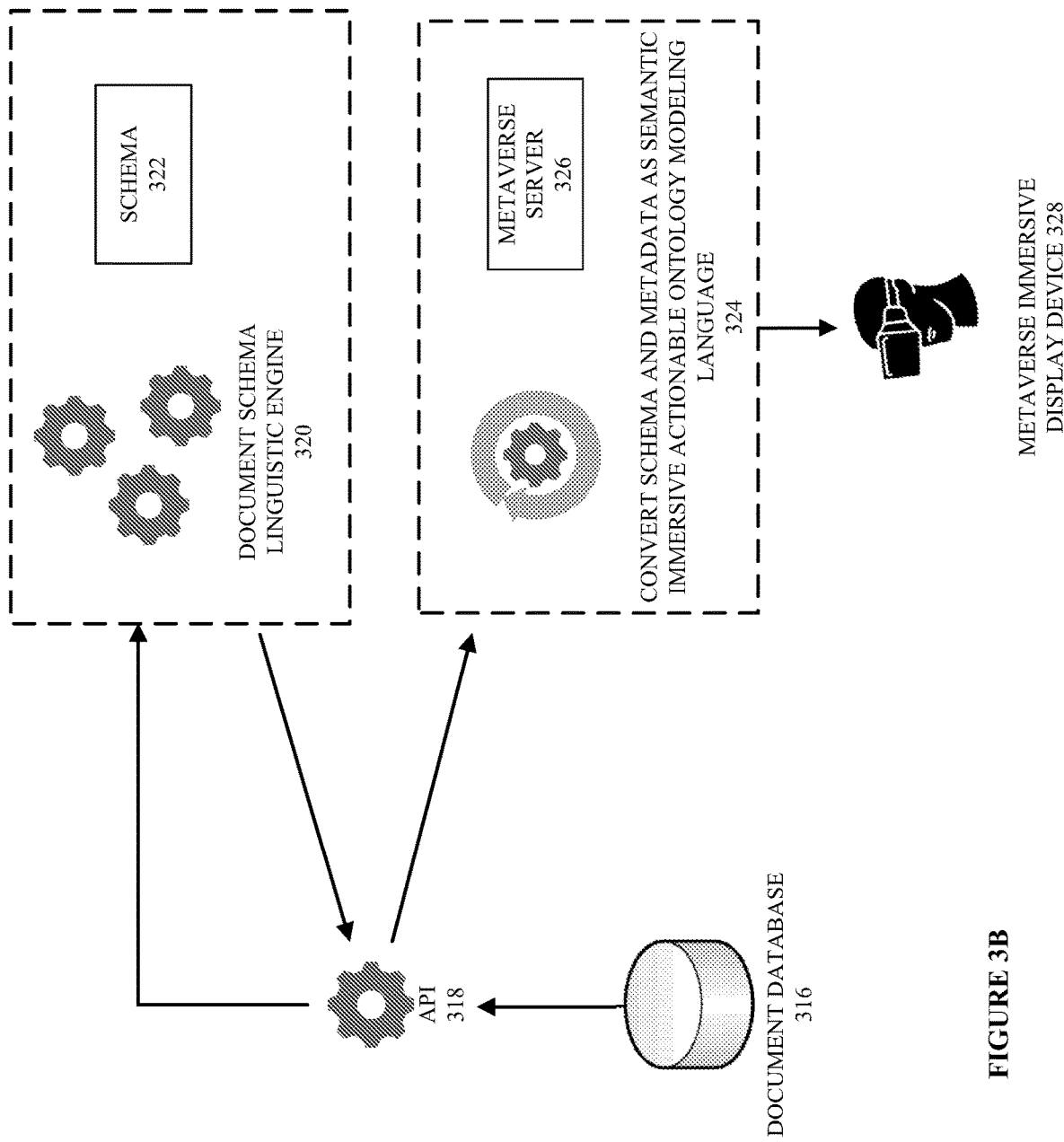

FIGS. 1A-1C illustrates technical components of an exemplary distributed computing environment for processing resources and associated metadata in the metaverse using knowledge graphs, in accordance with an embodiment of the disclosure;

FIG. 2 illustrates an exemplary machine learning (ML) subsystem architecture 200, in accordance with an embodiment of the invention; and FIGS. 3A and 3B each illustrate a process flow for processing resources and associated metadata in the metaverse using knowledge graphs, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general purpose system into a specific purpose computing system.

As used herein, "machine learning" may refer to a subset of artificial intelligence that focuses on the development of algorithms, models, or systems capable of learning from and making predictions or decisions based on data. In some embodiments, machine learning may involve the use of statistical techniques, pattern recognition, or computational intelligence to create models that can adapt and improve over time. In one aspect, machine learning may encompass various methods, such as supervised learning, unsupervised learning, reinforcement learning, and deep learning, among others. The specific components of a machine learning system may vary based on the needs of the particular application or task. In some embodiments, machine learning may be configured to process, analyze, and learn from large volumes of structured or unstructured data, which may then be used to optimize the performance or accuracy of specific operational aspects of the system. Machine learning may be implemented within any general-purpose computing system, and in doing so, may execute embedded source code to control specific features of the general-purpose system, thereby transforming the general-purpose system into a specific-purpose computing system designed for machine learning tasks.

As used herein, a "machine learning engine" may refer to the core elements of an application or part of an application that serves as a foundation for a larger piece of software and drives the functionality of machine learning tasks within the software. In some embodiments, a machine learning engine may be self-contained but externally-controllable code that encapsulates powerful logic designed to perform or execute machine learning operations. In one aspect, a machine learning engine may be underlying source code that establishes file hierarchy, input and output methods, and how the machine learning component of an application interacts or communicates with other software and/or hardware. The specific components of a machine learning engine may vary based on the needs of the specific application as part of the larger piece of software. In some embodiments, a machine learning engine may be configured to retrieve resources created in other applications, which may then be ported into the engine for use during specific operational aspects of the engine. A machine learning engine may be configurable to be implemented within any general-purpose computing system. In doing so, the machine learning engine may be configured to execute source code embedded therein to control specific features of the general-purpose computing system to execute machine learning operations, thereby transforming the general-purpose system into a specific-purpose computing system designed for machine learning tasks.

As used herein, a "metaverse" may refer to a virtual or digital environment that serves as a foundation for a larger interconnected system, hosting multiple applications and users within a shared, immersive, and interactive space. In some embodiments, a metaverse may be self-contained but externally-accessible, encompassing powerful logic designed to support various types of activities, such as communication, entertainment, education, and commerce. In one aspect, a metaverse may be built upon underlying source code that establishes the structure, input and output methods, and how the different components of the metaverse interact or communicate with other software and/or hardware. The specific components of a metaverse may vary based on the needs of the specific applications and user experiences as part of the larger interconnected system. In some embodiments, a metaverse may be configured to retrieve resources created in other applications, which may then be ported into the metaverse for use during specific operational aspects of the environment. A metaverse may be configurable to be implemented within any general-purpose computing system. In doing so, the metaverse may be configured to execute source code embedded therein to control specific features of the general-purpose computing system to support various activities and interactions, thereby transforming the general-purpose system into a specific-purpose computing system designed for immersive and interconnected experiences.

As used herein, "augmented reality" (AR) may refer to a technology that overlays digital information, such as text, images, 3D models, or animations, onto a user's view of the real world, thereby creating an interactive and immersive experience that seamlessly integrates virtual elements with the physical environment. Augmented reality can be experienced through various devices, such as smartphones, tablets, smart glasses, or head-mounted displays, which utilize cameras, sensors, and displays to capture, process, and present digital content in real-time. In some embodiments, augmented reality systems may be self-contained but externally-accessible, encompassing powerful logic designed to support various types of activities, such as navigation, education, entertainment, and industrial applications. In one aspect, an augmented reality system may be built upon underlying source code that establishes the structure, input and output methods, and how the different components of the system interact or communicate with other software and/or hardware. The specific components of an augmented reality system may vary based on the needs of the specific applications and user experiences as part of the larger interconnected system. In some embodiments, an augmented reality system may be configured to retrieve resources created in other applications, which may then be ported into the system for use during specific operational aspects of the environment.

As used herein, a "virtual reality system" may refer to a digital platform or environment that serves as a foundation for creating immersive, three-dimensional experiences within various applications, such as entertainment, education, and training. In some embodiments, a virtual reality system may be self-contained but externally-accessible, encompassing powerful logic designed to support various types of activities, such as user interaction, simulation, and navigation. In one aspect, a virtual reality system may be built upon underlying source code that establishes the structure, input and output methods, and how the different components of the virtual reality system interact or communicate with other software and/or hardware. The specific components of a virtual reality system may vary based on the needs of the specific applications and user experiences as part of the larger interconnected system. In some embodiments, a virtual reality system may be configured to retrieve resources created in other applications, such as 3D models, which may then be ported into the virtual reality system for use during specific operational aspects of the environment.

As used herein, a "3D model" may refer to a digital representation of a physical object or environment that serves as a foundation for creating realistic, three-dimensional visualizations within various applications, such as computer graphics, virtual reality, and entertainment. In some embodiments, a 3D model may be self-contained but externally-accessible, encompassing powerful logic designed to support various types of activities, such as rendering, animation, and simulation. In one aspect, a 3D model may be built upon underlying source code that establishes the structure, input and output methods, and how the different components of the 3D model interact or communicate with other software and/or hardware. The specific components of a 3D model may vary based on the needs of the specific applications and user experiences as part of the larger interconnected system.

As used herein, a "knowledge graph" may refer to a structured, interconnected representation of information, concepts, and relationships that enables the organization, storage, and retrieval of knowledge in a way that is both machine-readable and human-understandable. Knowledge graphs typically consist of nodes representing entities or concepts, and edges representing the relationships or connections between those entities. These relationships can be of various types, such as hierarchical, associative, or causal, providing rich context and meaning to the information. As used herein, "knowledge representation" may refer to a systematic approach to encoding, organizing, and structuring information or knowledge in a way that allows machines, such as computers and artificial intelligence systems, to process, understand, and reason with it. Knowledge representation techniques typically involve the use of formal languages, data structures, and computational models to capture the essential elements, relationships, and properties of a particular domain or problem space.

As used herein, a "schema" may refer to a structured representation or blueprint that defines the organization, relationships, and constraints of data within a database, application, or information system. A schema typically serves as a foundation for designing, implementing, and managing data storage, retrieval, and manipulation processes in various software applications, databases, or data processing systems.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

An "ontological model," as used herein, refers to a formal representation of the concepts, relationships, and constraints within a specific domain or area of knowledge. The ontological model may be developed using various methodologies, languages, or tools, and may be implemented in different formats or data structures. Furthermore, an ontological model may be static or dynamic, meaning that it may remain constant over time or evolve as new information is incorporated. Additionally, ontological models may be standalone or integrated with other models or systems, enabling interoperability and collaboration among different domains or applications. Furthermore, ontological models may be employed in a wide range of tasks, including but not limited to natural language processing, data integration, semantic search, and expert systems. Moreover, ontological models may leverage advances in machine learning, data mining, and immersive technologies to enhance their utility and user experience.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

The present invention provides a system capable of understanding requirement documents and delivering symbolic representations of actual objects, events, and relationships in real-time. The system is self-governing and based on an ontological actional model, thereby reducing the effort required by architecture or business analyst teams. The schema and document content are generated in real-time while creating the design document. The system uses enterprise architecture for building document delineation as the domain of application. As used herein, "enterprise architecture" may refer to a comprehensive framework or blueprint that outlines the structure, organization, and interrelationships of an organization's information technology (IT) systems, processes, and strategic objectives. Enterprise architecture serves as a foundation for aligning IT and business strategies, enabling effective decision-making, and facilitating the design, planning, implementation, and governance of the organization's technology infrastructure and applications.

As described herein, ontological models are constructed on top of a corpus of data extracted from digital design documents, refined with knowledge and frequency of appearing data. Ontological models play a significant role in the field of knowledge representation and management, artificial intelligence, and semantic technologies. These models provide a formal representation of the concepts, relationships, and constraints within a specific domain or area of knowledge. By defining the underlying structure and semantics of a domain, ontological models enable more effective and efficient information retrieval, reasoning, and decision-making.

In recent years, the development and application of ontological models have gained considerable attention across various industries and research domains. These models have been employed in tasks such as natural language processing, data integration, semantic search, and expert systems. However, the creation, maintenance, and implementation of ontological models can be complex and time-consuming, often requiring specialized expertise and resources.

Existing approaches to constructing and utilizing ontological models may be limited in their ability to adapt to new or changing domain knowledge or to scale effectively as the volume and complexity of domain-specific data grow. Furthermore, these approaches may not fully capitalize on advances in machine learning, data mining, and immersive technologies to enhance the utility and user experience of ontological models.

There is a need for innovative methods and systems for creating, maintaining, and utilizing ontological models that address the challenges and limitations associated with traditional approaches. These new methods and systems should facilitate more effective and efficient knowledge representation and reasoning, while also leveraging advances in related technologies to improve the overall user experience. A machine learning algorithm-based technique is employed to interpolate ontology trajectories with real data extraction, considering deontic reasoning elements (non-participating) and alethic elements (participating) defined specifically.

The real-time ontological actional model for conceptualizing documents employs a 3D word gesture algorithm. Lexical and semantic refinements are performed on the data corpus to build a structured, knowledge-based immersive graphical system. The ontological action modeling builds a knowledge representation (KR) on the provided inputs about the quantified domain for processing. The system includes a fragmented theory of cognitive reasoning for determining participating and non-participating elements with pragmatic anchors, providing epistemic consistency of representations. This improves domain expertise knowledge across teams.

The 3D word gesture algorithm offers a next-generation process for creating a realistic sense of application with three-dimensional gestural motions and tracking, inferring strong spatial-temporal representations. Immersive documents are submitted to and received from metaverse servers. The metaverse platform's immersivity enables creators to modify and add content. Metaverse servers are updated with all on-screen content contemporaneously. Metaverse creators update any future document content to and from metaverse servers using the same 3D word gesture algorithm to include updated or modified versions. In this approach, document delineation graphical node structures are self-explanatory, allowing reviewers to understand and gain knowledge about changes requested by different owners in the immersive platform. As such, the present invention provides an efficient, real-time, and immersive approach to conceptualizing documents, improving collaboration, and ensuring consistency across teams and domains.

Accordingly, the present disclosure includes a real-time ontological actional model which conceptualizes documents using a 3D word gesture algorithm, performing lexical and semantic refinements to build a structured, knowledge-based immersive graphical system. Ontological action modeling creates knowledge representation (KR) for the quantified domain, employing a fragmented theory of cognitive reasoning to determine participating and non-participating elements with pragmatic anchors, ensuring epistemic consistency and improving domain expertise knowledge across teams. The 3D word gesture algorithm enables a realistic application experience through three-dimensional gestures, motions, and tracking, with immersive documents being submitted to and received from metaverse servers. The metaverse platform allows creators to modify and add content with real-time updates to servers, while document delineation graphical node structures are self-explanatory, enhancing understanding and knowledge acquisition. This efficient, real-time, and immersive approach significantly improves collaboration and consistency across teams and domains.

FIGS. 1A-1C illustrate technical components of an exemplary distributed computing environment 100 for processing resources and associated metadata in the metaverse using knowledge graphs, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIGS. 3A and 3B each illustrate a process flow for processing resources and associated metadata in the metaverse using knowledge graphs, in accordance with an embodiment of the disclosure. The proposed solution aims to simplify the tasks of architectural and analyst teams in constructing schemas by consuming unstructured change requirement documents with real-time ontological actional modeling. This approach facilitates the creation of simple catalogs through a cognitive-driven methodology, providing guidance on essential architectural decisions while considering the impacts on all applications. Schema creation is accomplished with element mapping, organized by semantic gravitation, which is subjective to similarity or proximity within unstructured data in real-time, without delay. In other words, semantic gravitation refers to a concept where meaning, context, or relationships between words, phrases, or concepts in a given dataset are analyzed and organized based on their similarity or proximity to each other. Semantically related elements tend to "gravitate" towards each other, forming clusters or groups that share common characteristics. This approach is used in various fields such as natural language processing, text mining, and information retrieval to uncover hidden patterns, improve search results, and enhance the understanding of complex datasets.

In the context of the present invention, various users 302 and stakeholders 304 may be involved in the process. The customer layer, for example, may refer to financial entity users 302 and stakeholders 304 who utilize the facilities available for this delineation provision. These individuals derive benefits from the ontological action modeling system, which facilitates an efficient and effective approach to managing and processing information related to their entity activities. Workstations 306 may serve as the entity's digital platform for data sources. Data generated from interactions between users 302 or stakeholders 304 and entity applications can reveal multiple documents exchanged among them. Any new adoption with existing entity activity needs may require the reformation of existing business rules, delineations, and various design documents associated with the requested changes. Each of these business acceptances may undergo a design lifecycle involving various system analysts, along with architects, to confirm design principles related to the suggested changes. The process of validating and building design documents to understand the ground-level information and impact on the entity system may require significant manual effort. The workstations 306, in this context, represent user interfaces or digital modes for exchanging these design documents, streamlining the process and enhancing collaboration among involved parties.

In the context of the present invention, digital documents 308 may refer to original design documents created by system or entity analysts for a change request. These documents illustrate actual change, with assumptions and detailed design outlining how the reformation of entity rules will occur. The documents provide clarity on the impacted portions of prevailing functionalities, enabling developers to better understand any changes required. Network Attached Storage (NAS) 310 is a high-capacity storage device that connects multiple systems to store and retrieve bulk files. The NAS 310 can be connected through network access and serves to host large files or large numbers of files, and allowing for exponential growth when needed. The NAS also possesses computing intelligence for managing files appropriately. Secure File Transfer Protocol (SFTP) facilitates secure transmission of files over the network. SFTP transfers files using both File Transfer Protocol (FTP) (as depicted at FTP 312 in FIG. 3A) and Secure Shell (SSH), which incorporates cryptographic elements. SSH provides protection from malicious attacks by ensuring users are authenticated before transmitting or receiving files.

As such, the present invention discloses an intelligent system for conceptualizing delineation from unstructured data. This intelligent apparatus converts design documents retrieved from NAS through SFTP into modular design deliverables or any delineations related to entity documents, as shown in FIG. 3A at conversion of digital documents to XML process flow step 314. A document database (DB) 316 serves as a storage system for low-level extracts of design documents, such as XML or formatted metadata. This datastore stores the actual artifacts that can be shared with developers as an optimal product for adopting change. Developers and quality analysts can access this datastore to extract low-level design changes. The system also includes an Application Programming Interface (API), such as API 318 shown in FIG. 3B, to support conceptualizing delineation. The API 318 is a set of functions developed to interact with the Document DB data layer and the intelligent ontological modeling system for conceptualizing document delineation. It enables data transmission to and from the intelligent system through the data layer.

Additionally, the system comprises a Document Delineation Definition Language Modulation Linguistic Engine, as indicated in FIG. 3B at item 320. Document delineations are part of the deliverables driven by system or analysts for a change request. The assembly of document delineation languages specifies XML-driven document structures used in connection with databases and application-to-application message trading with the integration of assorted data formats. The Document Schema Definition Language (DSDL) is an international standard defining an integrated set of specifications outlining document structures, primitive data types, and relationships in structured and well-defined formats for storing schema 322. This modulation linguistic engine 320 creates an abstract document delineation based on the data extracted through the API 318. The chronological model of XML or other message patterns is designed within this engine, based on the inputs provided.

Furthermore, the present invention discloses an ontological actional modeling engine. This system converts document delineation and metadata into a semantic, immersive, actionable ontological modeling language, as shown in block 324 of FIG. 3B. The system serves as a channel for an immersive environment linked with semantic data extraction led by an API, such as API 318, which processes the content and context of unstructured data derived from design documents. The ontological actional modeling engine is a multilingual lexical ontological modeling system that mines the retrieved data to create a formulated structure. The ontology model is supported by Lexical Semantic Networks (LSNs) and Multilingual LSNs (MLSNs). Model evolution is performed based on data embeddings with consideration of the granularity of relationships between the elements. XML or formulated metadata delineation is input for a data preprocessing phase, which removes noise and extracts necessary elements needed for building a corpus. The corpus is supplemented with additional elements received from the input feed, and the resulting document corpus is stored in a datastore for building the ontological model. Lexical and semantic refinements are performed on the data corpus to build a structured, knowledge-based system.

It is understood that, in ideal embodiments, the reasoning engine of the system is a polyglot, robust rules appliance proficient in reasoning abilities on the factual knowledge base. One of ordinary skill in the art will appreciate that, as used herein, "polyglot" refers to the ability to understand, speak, or use multiple languages. In the context of computer programming, a polyglot system or programmer is one that can work with multiple programming languages or employs various languages to perform different tasks within a single project. This versatility allows for a more comprehensive and adaptable approach to problem-solving and can lead to increased efficiency and compatibility in software development or system design. It employs multiple reasoning logic to justify the requirement match with the corpus. The ontological models are built on top of the corpus of data extracted from digital design documents, refined with knowledge and frequency of appearing data. Machine learning algorithms are utilized to interpolate ontology trajectory with real data extraction, considering deontic reasoning elements (non-participating) and alethic elements (participating) defined specifically.

The ontological action modeling builds a knowledge representation (KR) based on the provided inputs about the quantified domain for processing. It employs a fragmented theory of cognitive reasoning to determine participating and non-participating elements with pragmatic anchors, providing epistemic consistency of representations. This approach improves domain expertise knowledge across teams. The structure of document delineation is defined, and the content conversion from digital to immersive is performed using a 3D word gesture algorithm. This algorithm is a next-generation process that provides a realistic sense of application with three-dimensional gestural motions and tracking, inferring strong spatial-temporal representations. Immersive environments play a vital role in this apparatus, providing a spontaneous comprehension of multi-dimensional structures of business elements and offering new data relationship methods to reduce the effort invested in understanding data elements and their associated relationships.

The 3D word gesture algorithm is a sophisticated method for recognizing and interpreting human gestures in a three-dimensional space, translating them into words or phrases using computer vision and natural language processing techniques. The algorithm comprises gesture detection, feature analysis, and gesture recognition stages. It employs depth sensing, image segmentation, and feature extraction to identify and track hand or body movements, followed by analysis of movement patterns, such as trajectory, speed, and orientation. Machine learning and natural language processing techniques are used to match gesture patterns with pre-defined words or phrases, enabling applications in virtual and augmented reality and human-computer interaction.

The developed content delineation, depicted using an immersive platform, displays the bundled structure of data through a defined structure. An immersive platform refers to a digital environment or system that is designed to provide users with a highly engaging, interactive, and realistic experience by simulating aspects of the physical world or creating entirely new virtual spaces. These platforms often utilize technologies such as virtual reality (VR), augmented reality (AR), or mixed reality (MR) to seamlessly integrate digital content with the user's surroundings, creating a sense of presence and immersion. Immersive platforms can be found in various domains, including entertainment, education, training, and communication, and they often feature advanced graphics, audio, and interactivity to enhance the user experience. The specific components and technologies used in an immersive platform may vary depending on the application's requirements and goals, but the primary objective is to create a convincing and engaging experience for the user. In the context of the present invention, this simulation assists architects and entity users in authorizing changes captured as part of design documents. The hypothesis of ontological actionable modeling in a semantic, immersive platform leads to a setup where document content conception development is performed for data received through various channels with minimal human effort. All immersive documents are submitted to and received from metaverse server(s) 326.

In the context herein, a "metaverse platform" may be employed for applying extended reality (XR) techniques to document delineation. The immersive nature of the metaverse platform enables creators to modify or add XML/DSDL documents. The document definition, generated from the actual data and ontological model, can be reviewed, edited, or deleted by entity users within the metaverse platform. This interactive platform allows users to engage with and visualize the projected model, determining if any additional manual intervention is required. The metaverse server 326 is configured to update with all on-screen content instantaneously. Moreover, metaverse creators can update or incorporate future document content to and from the metaverse server 326 using the same 3D word gesture algorithm, ensuring that updated or modified versions are included. A "3D word gesture algorithm" may refer to an advanced computational technique designed to process and represent textual information within a three-dimensional space using gestural motions and tracking. This algorithm enables the creation of strong spatial-temporal representations, providing users with a more immersive and realistic sense of application.

By converting textual data into 3D gestural representations, the 3D word gesture algorithm enhances the comprehension and interaction with complex content, particularly in virtual or augmented reality environments, and facilitates a more intuitive understanding of relationships between different data elements. A 3D gesture algorithm can be implemented using various programming languages, depending on the platform and specific requirements of the application. C++ is often used in high-performance 3D applications for entertainment and computer graphics, while C #is popular for developing 3D applications using the Unity engine, which supports virtual and augmented reality development. Python is another versatile option, especially when using libraries like Panda3D for entertainment or OpenCV for computer vision tasks. JavaScript and TypeScript are popular choices for web-based 3D applications using WebGL or libraries such as Three.js or Babylon.js. The choice of programming language ultimately depends on the project's specific needs, target platform, and developers' expertise.

As will be appreciated by one of ordinary skill in the art, the present disclosure may be embodied as an apparatus (including, for example, a system, a machine, a device, a computer program product, and/or the like), as a method (including, for example, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for processing resources and associated metadata using knowledge graphs, the system comprising:
    a processing device;
    a non-transitory storage device containing instructions when executed by the processing device, causes the processing device to perform the steps of:
    receive one or more documents from a digital data source;
    store the one or more documents in a network attached storage via a file transfer protocol;
    convert the one or more documents to extensible markup language format;
    store converted documents in an application programming interface (API) accessible document database;
    generate a downstream process API to access the API accessible document database;
    generate an abstract document delineation for the one or more documents based on data extracted via the downstream process API; and
    convert the abstract document delineation and metadata into semantic, immersive, actionable ontological modeling language.

2. The system of claim 1, wherein the downstream process API comprises a set of functions developed to interact with the document database data layer and an intelligent ontological modeling system.

3. The system of claim 1, wherein the file transfer protocol further comprises secure file transfer protocol (SFTP) generating secure transmission of files over a network by incorporating cryptographic elements.

4. The system of claim 1, wherein the ontological modeling language is generated using an ontological actional modeling engine comprising a multilingual lexical model.

5. The system of claim 1, further configured to generate a knowledge representation (KR) based on the semantic, immersive, actionable ontological modeling language.

6. The system of claim 5, wherein structure of the abstract document delineation is defined, and the content conversion from abstract document delineation and metadata into semantic, immersive, actionable ontological modeling language is performed, using a three-dimensional (3D) word gesture algorithm.

7. The system of claim 6, further configured to transmit displayable information of the KR to one or more extended reality devices.

8. A computer program product for processing resources and associated metadata using knowledge graphs, the computer program product comprising a non-transitory computer-readable medium comprising code causing an apparatus to:
    receive one or more documents from a digital data source;
    store the one or more documents in a network attached storage via a file transfer protocol;
    convert the one or more documents to extensible markup language format;
    store converted documents in an application programming interface (API) accessible document database;
    generate a downstream process API to access the API accessible document database;
    generate an abstract document delineation for the one or more documents based on data extracted via the downstream process API; and
    convert the abstract document delineation and metadata into semantic, immersive, actionable ontological modeling language.

9. The computer program product of claim 8, wherein the downstream process API comprises a set of functions developed to interact with the document database data layer and an intelligent ontological modeling system.

10. The computer program product of claim 8, wherein the file transfer protocol further comprises secure file transfer protocol (SFTP) generating secure transmission of files over a network by incorporating cryptographic elements.

11. The computer program product of claim 8, wherein the ontological modeling language is generated using an ontological actional modeling engine comprising a multilingual lexical model.

12. The computer program product of claim 8, the computer program product comprising a non-transitory computer-readable medium comprising code further causing an apparatus to generate a knowledge representation (KR) based on the semantic, immersive, actionable ontological modeling language.

13. The computer program product of claim 12, wherein structure of the abstract document delineation is defined, and the content conversion from abstract document delineation and metadata into semantic, immersive, actionable ontological modeling language is performed, using a three-dimensional (3D) word gesture algorithm.

14. The computer program product of claim 13, the computer program product comprising a non-transitory computer-readable medium comprising code further causing an apparatus to transmit displayable information of the KR to one or more extended reality devices.

15. A method for processing resources and associated metadata using knowledge graphs, the method comprising:
    receiving one or more documents from a digital data source;
    storing the one or more documents in a network attached storage via a file transfer protocol;
    converting the one or more documents to extensible markup language format;
    storing converted documents in an application programming interface (API) accessible document database;
    generating a downstream process API to access the API accessible document database;
    generating an abstract document delineation for the one or more documents based on data extracted via the downstream process API; and
    converting the abstract document delineation and metadata into semantic, immersive, actionable ontological modeling language.

16. The method of claim 15, wherein the downstream process API comprises a set of functions developed to interact with the document database data layer and an intelligent ontological modeling system.

17. The method of claim 15, wherein the file transfer protocol further comprises secure file transfer protocol (SFTP) generating secure transmission of files over a network by incorporating cryptographic elements.

18. The method of claim 15, wherein the ontological modeling language is generated using an ontological actional modeling engine comprising a multilingual lexical model.

19. The method of claim 15, the method further comprising generating a knowledge representation (KR) based on the semantic, immersive, actionable ontological modeling language.

20. The method of claim 19, wherein structure of the abstract document delineation is defined, and the content conversion from abstract document delineation and metadata into semantic, immersive, actionable ontological modeling language is performed, using a three-dimensional (3D) word gesture algorithm.

* * * * *